RECORDING SYSTEM WITH PROVISION FOR FAST OR SLOW REPRODUCTION

Filed Nov. 2, 1960 2 Sheets-Sheet 1

INVENTOR
SHIRO OKAMURA
BY Roy C. Hopgood
ATTORNEY

RECORDING SYSTEM WITH PROVISION FOR FAST OR SLOW REPRODUCTION

Filed Nov. 9, 1960 2 Sheets-Sheet 2

INVENTOR
SHIRO OKAMURA
BY Roy C. Hoggood
ATTORNEY

United States Patent Office

Re. 27,371
Reissued May 16, 1972

27,371

RECORDING SYSTEM WITH PROVISION FOR FAST OR SLOW REPRODUCTION

Shiro Okamura, Tokyo, Japan, by Nippon Electric Company, Limited, Tokyo, Japan, assignee Original No. 3,170,031, dated Feb. 16, 1965, Ser. No. 338,277, Dec. 27, 1963, which is a continuation of Ser. No. 66,770, Nov. 2, 1960. Application for reissue Mar. 22, 1971, Ser. No. 126,569
Int. Cl. G11b *5/48;* H04n *5/78, 7/12*
U.S. Cl. 178—6.6 A 17 Claims

Matter enclosed in heavy brackets [ ] appears in the original patent but forms no part of this reissue specification; matter printed in italics indicates the additions made by reissue.

*ABSTRACT OF THE DISCLOSURE*

*Apparatus for magnetically recording adjacent periods of a periodic signal in closely adjacent laterally aligned parallel tracks on a record medium.*

This invention relates to a signal treating system utilizing interpolation of the time pattern of information, and more particularly, it relates to a system for frame frequency conversion, for signal bandwidth compression and also for selectively varying slow and quick motion processes in television. This application is a continuation of my copending application Serial No. 66,770, filed November 2, 1960, now abandoned.

One object of the present invention is to provide a novel transmission system whereby an arbitrary conversion between two signals which differ in scanning frequency is feasible.

Another object of the present invention is to provide a novel signal treating system which permits band compression without noticeable flicker, distortion or a reduction in definition.

Still another object of the present invention is to provide a novel video signal treating system which makes it possible arbitrarily to vary the "time velocity" of a television picture being transmitted, i.e., to produce slow motion or quick motion, for example, of the picture during the normal time of transmission. The invention is not limited however to use with a video signal but may find application with other types of periodical signals comprising sub-periods similar to the horizontal line sub-periods of the video signal.

According to one aspect of the invention, there is provided a signal treating system having means for recording video signals along a plurality of recorded tracks arranged one after another, the tracks being similar except for variation due to elapsing time, means for permitting interpolation between adjacent tracks, and means for reproducing the video signals from the recorded tracks.

According to another aspect of the invention there is provided a television system having means for recording a video signal, means for recording the tracks in parallel arrangement one after another, means for making adjacent tracks substantially similar except for variation due to elapsing time, means permitting interpolation between said adjacent tracks, and means for reproducing the video signal having an arbitrary repeating rate from the recorded tracks.

According to another aspect of the invention there is provided a signal treating system having means for recording a video signal in parallel tracks arranged one after another, adjacent tracks being similar except for variation due to the time elapsing, means permitting interpolation between the adjacent tracks, means for reproducing a substantially flickerless video signal having a different field frequency from that of the recording, means for transmitting the said reproduced video signal, and means for again recording the said transmitted video signal in accordance with the recording procedure, and means for reproducing a video signal of still another frequency.

According to another aspect of the present invention there is provided a television system having means for reproducing a signal which has a different time elapsing rate from the rate at which the signal is recorded as above described, whereby the effect of slow motion, quick motion and stationary memory of the picture can be arbitrarily introduced into the picture of normal time duration.

According to still another aspect of the present invention there is provided a video tape recorder in which the adjacent parallel tracks have approximately the same information except for the variation due to time elapsing and in which interpolation may be performed between adjacent tracks.

All of the objects, features and advantages of this invention and the manner of attaining them will become more apparent and the invention itself will be best understood by reference to the following description of an embodiment of the invention taken in conjunction with the accompanying drawings, in which FIG. 1 illustrates an example of a recording medium having tracks recorded thereon according to the invention;

Figure 1:
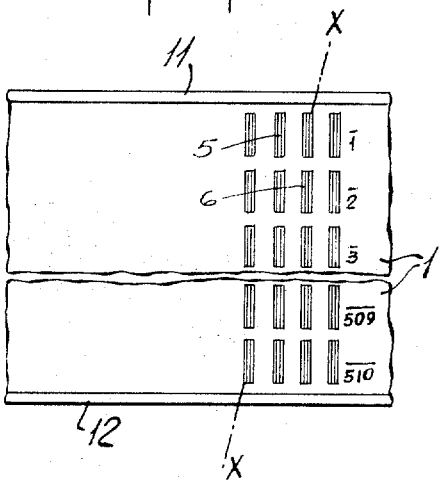
Figure 2:
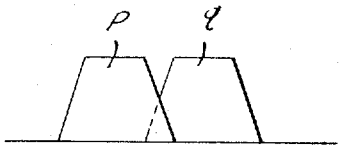
FIG. 2 is a view illustrating the recorded signal intensities of selected track segments taken transversely of the tracks.

In FIG. 1 there is shown a magnetic storage recording medium in the form of a magnetic tape 1. On this tape there is recorded a plurality of tracks adjacent and parallel to one another, each track comprising a plurality of recorded track segments $\overline{1}$, $\overline{2}$, $\overline{3}$ . . . $\overline{509}$ and $\overline{510}$ which together make one picture frame. Each track segment corresponds to one horizontal line signal of one frame of a video signal. For simplicity, interlacing is not shown in FIG. 1. Each corresponding track segment in each track is arranged exactly at the same distance from the boundaries or border lines 11 and 12 as shown. These border lines may coincide with the vertical blanking portion of the video signal. It is to be noted that this arrangement facilitates switching from one border to the other. The recorded track segments overlap at their edges as shown in FIG. 2 by the letters p and q, which designate the recorded signal intensities for adjacent tracks 5 and 6, so that the reproduced output may be substantially constant, rather than becoming null even if the reproducing head may not scan the tracks in alignment therewith. The vertical height of the recorded signal intensities p and q may also indicate the intensity of the reproduced signal, and the horizontal length of the scan corresponds to the distance lateral to the tracks 5, 6 and so on. It is also to be noted that this arrangement allows economic utilization of the area of the recording medium and also an improvement in the accuracy of the translation velocity of the medium because the information always varies gradually along the tape length.

Figure 3A:
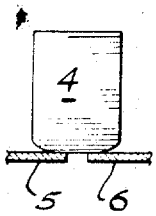
FIGS. 3A and 3B show respectively the elevation and the side view of a reproducing magnetic head with respect to the recorded tracks.
Figure 3B:
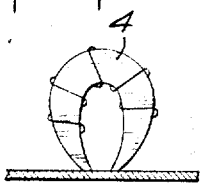

This constancy of the reproduced signal can also be obtained by means of a reproducing head 4 having a rather broad width compared with the distance between the tracks as shown in FIG. 3. FIG. 3A shows the elevation of the reproducing head and FIG. 3B shows the side view thereof. Adjacent recorded tracks are indicated by the numerals 5 and 6 in FIG. 3A. In any case, the overall response may be substantially constant during the recording and reproducing procedure. This constancy of the reproduced signal, however, is not absolutely necessary. Some existing variation of the overall response may be cancelled by one of the known techniques, such as for example, limiting, controlling the gain, or making use of feedback circuits.

As described above, each recorded pattern of the video signal across the width of the tape produces continuous scanning as a function of time, as distinguished from the recording process of the prior art. Thus, for example, the dashed line x—x in FIG. 1 indicates a scanning at one third of the original scanning rate and the reproduced signal will therefore have a frame frequency one third that of the original or recorded rate. In accordance with the principles of the invention, the frame frequency of the reproduced signal may be varied over a wide range by choosing the speed of the reproducing head so that it has a lateral component of velocity across the tracks.

Figure 4:
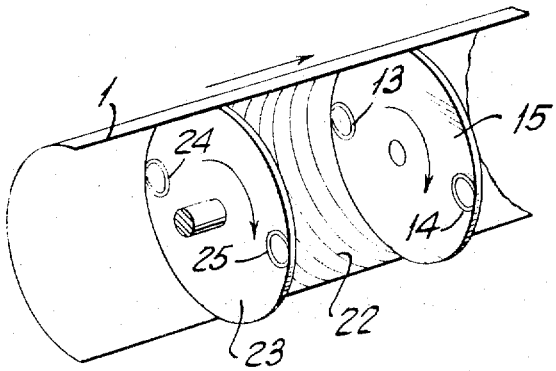
FIGS. 4 and 5 are simplified diagrams of recording and reproducing apparatus according to the invention.

FIG. 4 is a simplified drawing of apparatus for performing the recording and reproducing as discussed above. In this figure two magnetic heads 13 and 14 on a rotating drum 15 scan the magnetic tape 1 as it is translated from left to right, thus yielding the recorded tracks indicated by the numeral 22. The period of revolution of the drum corresponds to the frame period or its multiples of the video signal so as to form the pattern as shown in FIG. 1. The recording and/or reproducing procedure contains the aforesaid overlapping relationship of adjacent track segments, as shown in FIG. 2. The two heads 13 and 14 may be switched or not switched as appropriate. The reproducing head drum 23 containing two heads 24 and 25 may be rotated at different speeds to yield a video signal of an arbitrary reproducing frame frequency different from that of the recording frame frequency. The magnetic tape 1 must, of course, be curved as shown to conform to the curvature of the rotating drums 15 and 23.

Figure 5:
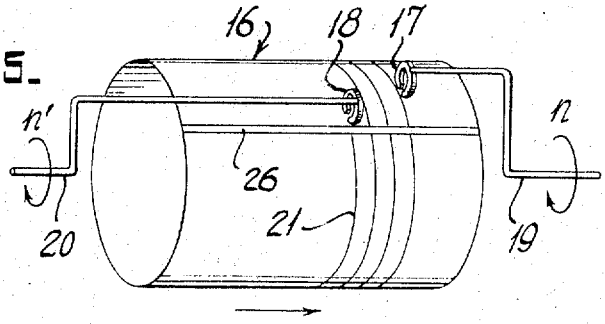

FIG. 5 shows another example of apparatus utilized in the present invention. A magnetic drum 16 is translated relatively from left to right and a recording head 17 rotating at n revolutions per second and a reproducing head 18 rotating at n′ revolutions per second are provided. The recorded tracks are indicated by numeral 21. The drum 16 may also be rotated if desired. This drum 16 has a vertical blanking portion or portions 26, in the case of FIG. 1, since the rotating speed n is chosen to be equal to the frame frequency or a fraction thereof. The drum 16 can be scanned by the reproducing head 18 at an arbitrary number of revolutions n′ as described above which is designed to produce overlapping of adjacent tracks, as shown in FIG. 2. Thus the apparatus shown in FIG. 5 operates also as a frame frequency converter into any desired frame frequency without any flicker or reduction in definition. As a practical matter, the drum 16 can not be made as long as desired, so that switching is necessary to switch the translating direction for continuous operation. The apparatus shown in FIG. 4, however, may employ an endless tape.

Figure 6:
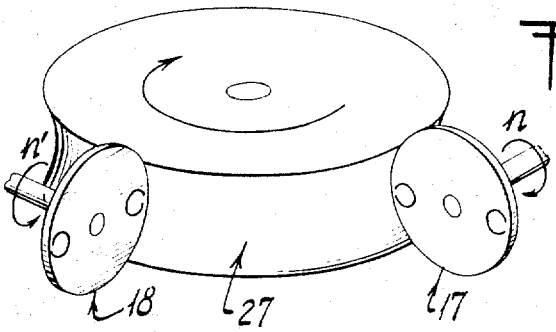
FIG. 6 is a simplified diagram of another embodiment of the recording and reproducing apparatus of the invention.

FIG. 6 shows another endless memory device in which a magnetic pulley 27 rotates slowly. The magnetic rim 27 of the pulley is traversed for recording by means of a recording head 17 and for reproduction by means of a reproducing head 18, both of which are rotated.

Figure 7A:
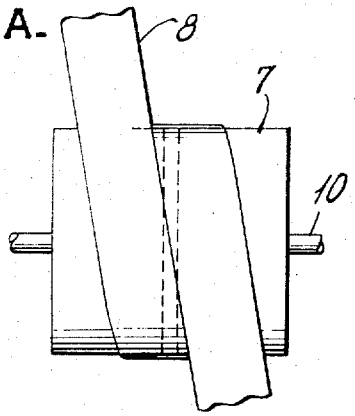
FIGS. 7A and 7B show still another example of a video tape recorder in accordance with the invention, the elevation being shown in FIG. 7A and the sideview in FIG. 7B.
Figure 7B:
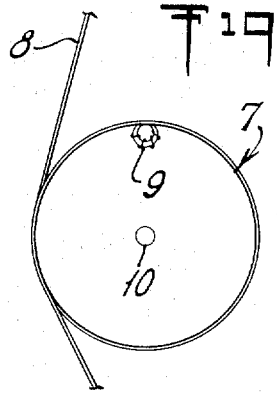
Figure 8:
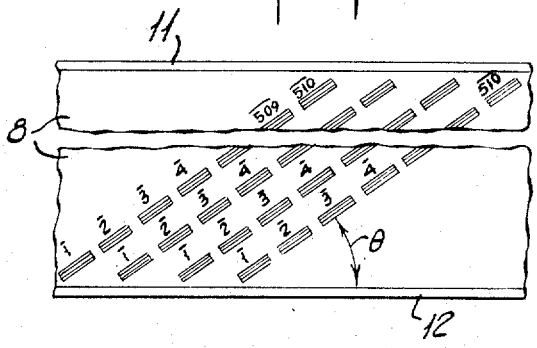
FIG. 8 shows one recorded pattern according to the invention which is produced by means of the apparatus shown in FIGS. 7A and 7B.
Figure 9:
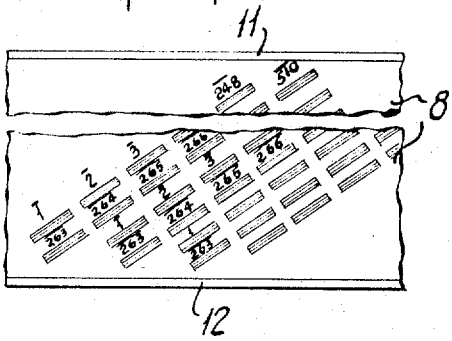
FIG. 9 shows another form of the recorded pattern according to the invention.

FIGS. 7A and 7B illustrate video tape recording equipment which is known as the single head VTR system. FIG. 7A shows the elevation and FIG. 7B the sideview of elements of this system. The magnetic tape 8 is wound and transported spirally around two coaxial cylinders 7 which are slightly separated as indicated by the dashed lines. A head 9, rotating about an axis 10, scans the inside of the tape 8. The recorded track pattern produced by this apparatus is shown in FIG. 8. The inclination angle $\theta$ of the track with respect to the longitudinal axis of the tape, can be varied by the design of the apparatus. It is therefore possible by the suitable design to record the consecutive frames or fields along adjacent oblique tracks, one after another, as shown in FIG. 8 or FIG. 9. The discrete track segments indicated by the numerals $\overline{1}$, $\overline{2}$, $\overline{3}$ . . . to $\overline{510}$ in FIG. 8 indicate the sequential number of the recorded horizontal line signals in a picture frame. In FIG. 9, numerals $\overline{1}$, $\overline{2}$, $\overline{3}$ . . . to $\overline{248}$, indicate one field of a frame, and numerals $\overline{263}$, $\overline{264}$, $\overline{265}$ to . . . $\overline{510}$ indicate another field, these two fields together comprising one frame. As shown, the discrete track segments of one track lie directly alongside the discrete track segments of adjacent tracks so as to form rows of discrete segments which are perpendicular to the direction of the tracks. Furthermore, the tracks of the recorded pattern are so positioned that the segments of the different tracks which represent corresponding lines of the different picture frames occupy corresponding positions with respect to the boundaries or edges 11–12 of the tape. By proper choice of the tape translation velocity and the inclination angle $\theta$, it is possible to provide the recorded pattern with the discrete segments positioned as described above.

FIG. 8 shows the case in which one frame is recorded in an oblique direction on each track, and FIG. 9 illustrates a pattern wherein each track represents one field and in which the effect of interlacing appears. In both cases of FIGS. 8 and 9 it will be apparent that adjacent recorded tracks have approximately the same information, so that if the effect of interpolation as shown in FIG. 2 is introduced into this system, the application is similar. Such recording patterns also enable economic use of the tape area and permit irregular tape translation velocity. The tape may be endless or not, as desired, depending on the application. Other suitable devices may be utilized in the present invention providing they permit the recorded pattern of the aforesaid nature.

The frame frequency converting system described above can also be employed to provide picture frequency conversion of motion pictures. For example, the picture frequency of 16 frames per second can easily be converted to 24 frames per second via the video signal as shown above. In such a case a television camera having a frame frequency of 24 produces a video signal which is recorded and reproduced according to the present invention. The reproduced picture of 24 pictures per second is again filmed by a corresponding synchronized camera.

Of course a video signal of different frame frequency from the original film can be easily produced and may be transmitted. For example, the frequency of 24 pictures per second can be comfortably transformed to a video signal frequency of 30 frames per second.

The frame frequency converting system according to the present invention can also be employed to produce band width compression, which is important for long range television transmission.

Figure 10:
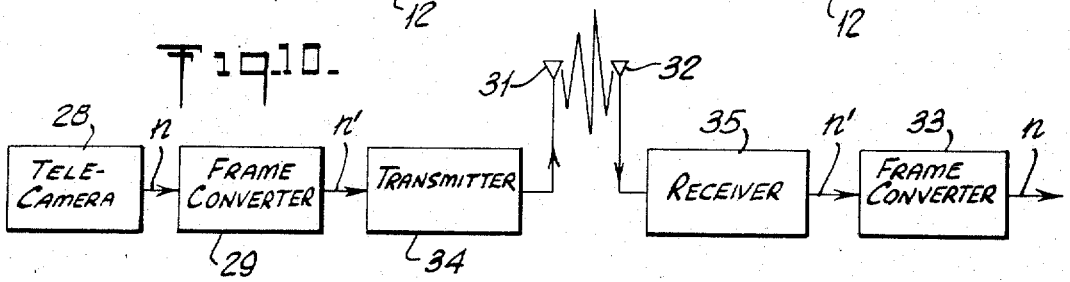
FIG. 10 is a block diagram of a band compression system according to the invention.

FIG. 10 is a simplified block diagram of this system according to the invention. In this figure, a television camera 28 produces a picture having a frame frequency of n, which is converted to a frame frequency of n′ by means of a frame converter 29, as described above. The converted video signal modulates a transmitter 34 and the modulated wave is propagated from an antenna 31 or transmitted via a cable. The received signal from the antenna or the cable is detected and amplified by a receiver 35 and the frame frequency of n′ is again converted to n or other frequency by means of a second frame converter 33. If the frequency n′ is chosen to be substantially smaller than the frequency n, the video band width is decreased by the factor n′/n. This band compression system has the advantage over the prior art that the reproduced picture is always flickerless and the definition is excellent so long as the motion of the televised object is not too rapid.

Figure 11:
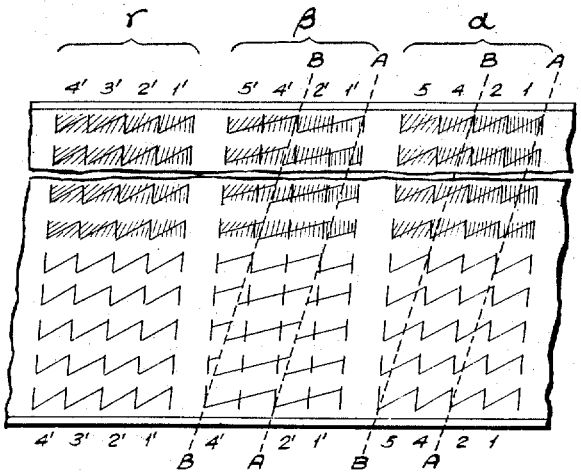
FIG. 11 shows recorded patterns which are employed for band compression of the video signal according to the invention.

FIG. 11 shows the patterns of succeeding converting procedures at the transmitting and receiving stations 34 and 35 respectively. The inclination of the hatched lines indicates the video information, one horizontal line of which is assumed to be unchanged throughout one frame period for simplicity. Only nine lines are shown in one frame for simplicity. Thus, tracks 1—1, 2—2, etc., correspond to the succeeding frame information on the pattern ($\alpha$) which shows the first recording procedure. The envelope of each group of hatched lines forms the information parallelograms for each line, which shows the gradual, continuous change along the succeeding frame. The recorded pattern ($\alpha$) is scanned along lines AA, BB, etc., which show a reproduction scanning of half of the recording frame frequency, i.e., $n'=n/2$. The reproduced signal is obtained at the interception of lines AA, BB, etc., with the information parallelograms occurring where the intercepting areas contribute to the inclination of the reproduced parallelograms as shown in ($\beta$). The pattern ($\beta$) is obtained by the procedure above described on reproduction from the pattern ($\alpha$). This is the transmitted and re-recorded signal at the frame converter 33 in FIG. 10. The re-recording procedure is also interpolatable as in the case of the frame converter 29. The pattern ($\beta$) is again reproduced at the frame frequency of $n=2n'$ along the scanning path AA, BB, etc. in ($\beta$). The reproduced pattern is shown at ($\gamma$) in FIG. 11. The drawing is made according to the procedure described above in conjunction with the converting procedure from the pattern ($\alpha$) to ($\beta$). It is to be observed that the pattern ($\gamma$) is quite similar to the pattern ($\alpha$). The similarity is dependent upon the velocity and linearity of movement of the original televised scene.

The converted frame frequency may be any fraction of the original frame frequency. It is not limited to division by an integer. The converted frame frequency may be varied if the atmospheric conditions so require. The frame frequency can be continuously varied with suitable synchronizing means, such as a vertical synchronizing pulse or a suitable pilot wave, by which means the receiver frame converter operates synchronously so as to form the pattern as shown in FIG. 11. Thus, the converted narrow band signal is transmitted on a carrier wave of narrow band width, which permits long range transmission. No flicker can be observed (as is seen in the narrow band transmission "frame down" system of the prior art. Of course, the received signal of the prior art "frame down" system can be converted into a continuous picture according to the present invention.

Another important application of the present invention is in the production of slow and quick motion of television pictures. As described above, the recorded track, according to the present invention, provides continuity of scan for the elapsing time. Thus, for example, the recorded track shown in FIG. 4 may be reproduced at an arbitrary tape velocity, so that slow motion, quick motion and standstill effect of a scene may be obtained without flicker.

If the reproduction takes place immediately after recording, and if the velocity of the tape or other medium relative to the scanning head is variable, slow or quick motion is arbitrarily introduced into the transmitting picture. This effect is considered as an arbitrary variation of the time axis of the phenomena which is never considered in television techniques because of the limitation in the prior art. For example, during a televised picture of a spotrs program, the scene may be suddenly stopped, or moved, or changed to slow motion or to quick motion, or even reversal of motion is possible. This is a new effect in television casting.

Such effects are performed by varying the relative displacement between the recording and reproducing head assemblies. If the distance between the recording and reproducing head becomes larger, the quick motion effect is introduced. If the distance becomes smaller, the slow motion effect is obtained. The standstill is the extreme of slow motion, and this is obtained by nulling the relative velocity between the tape and the reproducing head assembly. If the reproducing head assembly is moved faster than the tape velocity in a direction opposite to the direction of the recording assembly, the time elapsing is obviously reversed. For continuous picture transmission, the slow motion must be followed by quick motion and vice versa to return to the regular program. The apparatus shown in FIG. 6 is useful in this application.

For relatively short time treatment, the apparatus shown in FIG. 5 is preferable. The magnetic cylinder 16 is rotated at a velocity of, for example, frame frequency relative to the head assemblies 17 and 18. The heads may be rotated. Each head is translated relative to the cylinder axis with different velocities. This memory apparatus is capable of storing or treating the video signal for approximately ten seconds without switching back.

The treated signal according to the apparatus described above may arbitrarily be inserted or switched into the regular program, into which delaying means may be added if necessary.

Other apparatus may be employed for such treatment. For example the apparatus shown in FIG. 7 is very useful in that a tape of narrow width may be employed.

In the foregoing description, the storage mediums have been shown in the form of a tape, drum, and pulley. Any other suitable storage medium can of course be employed which may be translated relative to the locus of the scanning means. Also, while the invention has been described with particular reference to a video signal, it is to be understood that it can be employed with any periodical signal compirsing a plurality of sub-periods such as the horizontal periods of the video signal.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. A signal recording and reproducing system comprising a magnetic storage medium, means for receiving a periodical signal, means for recording said periodical signal on said magnetic storage medium with adjacent periods of said signal being recorded on adjacent tracks across said magnetic storage surface, said tracks being disposed substantially parallel to each other and being in lateral alignment closely adjacent to each other, and means for reproducing said signals recorded on said magnetic storage surface, said reproducing means being adapted to move in a path having a substantial and lateral component of velocity across said recorded tracks to speed up or retard said reproduced signals with respect to said recorded signals.

2. The combination defined in claim 1 in which said periodical signals comprise television signals and in which said reproducing means produce fast or slow motion effects in the reproduced television signals.

3. The combination defined in claim 1 in which said tracks are recorded in laterally overlapping relation to each other to permit smooth interpolation from one track to another.

4. A television transmission system comprising a television signal source adapted to produce periodical television output signals, a first signal recording and reproducing system as defined in claim 1 coupled to the output of said television signal source, said first signal recording and reproducing system being adapted to retard said reproduced signals with respect to said recorded signals, a television transmitter coupled to the output of said first signal recording and reproducing system, a television receiver adapted to receive the transmission of said television transmitter, a second signal recording and reproducing system as defined in claim 1 coupled to the output of said television receiver, said second signal recording and reproducing system being adapted to speed up its reproduced signal with respect to its recorded signal, and television signal display means coupled to the output of said second signal recording and reproducing system.

5. In a signal treating system, the improvement comprising means for receiving periodical signals, means for recording said periodical signals on a magnetic storage medium with adjacent periods of said signal being recorded on adjacent tracks across said magnetic storage surface, said tracks being disposed substantially parallel to each other, and reproducing means adapted to move in a path having a substantial and lateral component of velocity across said recorded tracks to speed up or retard the reproduced signals with respect to the recorded signals.

6. The combination defined in claim 5 in which said tracks are recorded in laterally overlapping relation to each other to permit smooth interpolation from one track to another.

7. A television transmission system comprising a television signal source adapted to produce periodical television output signals, a first signal treating system as defined in claim 5 coupled to the output of said television signal source, said first signal recording and reproducing system being adapted to retard said reproduced signals with respect to said recorded signals, a television transmitter coupled to the output of said first signal recording and reproducing system, a television receiver adapted to receive the transmission of said television transmitter, a second signal treating system as defined in claim 5 coupled to the output of said television receiver, and said second signal treating system being adapted to speed up its reproduced signal with respect to its recorded signal.

8. In a *video tape* system for recording and reproducing periodical signals comprising a series of recurring periods, each of which contains a plurality of recurring sub-periods, the improvement comprising means for receiving said periodical signals, means for recording said periodical signals on a magnetic *tape* storage surface with sequential periods of said signal being recorded on adjacent *oblique* tracks across said magnetic *tape* storage surface, *each track comprising a plurality of discrete segments, each of which corresponds to one of said sub-periods of said signals, said segments of any given track being positioned directly alongside the segments of adjacent tracks to form rows of segments which are perpendicular to the direction of said tracks,* and reproducing means adapted to move in a path having a lateral component of velocity across said recorded tracks to speed up or retard the reproduced signals with respect to the recorded signals.

9. The combination defined in claim 8 wherein said periodical signal is an interlaced television signal comprising a plurality of recurring frames each containing two recurring interlaced fields [.], *each oblique track corresponding to one field.*

10. The combination defined in claim 8 in which said [traces] *tracks* are disposed substantially parallel to each other and in which said tracks are recorded in laterally overlapping relation to each other to permit smooth interpolation from one track to another.

11. A signal recording system for recording on a storage medium having parallel boundaries a periodical signal having a plurality of periods each including a plurality of sub-periods comprising, recording transducer means, and means for moving said transducer means relative to and in close proximity to said storage medium to record said signal on said storage medium in the form of substantially parallel tracks having their ends of said boundaries, the relative speed between said transducer means and said storage medium being selected so that the length of each of said recorded tracks corresponds to at least one of said periods, each of said tracks comprising a plurality of discrete segments each of which corresponds to one of said sub-periods of said signal, said segments of any given track being positioned directly alongside the segments of adjacent tracks so as to form rows of segments which are perpendicular to the direction of said tracks, the segments in any given row further being in juxtaposed relationship with the segments in said row adjacent thereto, and said tracks being so positioned on said medium that the segments of the different tracks which represent corresponding sub-periods of the different periods of said signal occupy corresponding positions with respect to said boundaries of said meduim.

12. In a signal recording system for recording by means of a recording head a periodical signal having a plurality of periods each including a plurality of sub-periods, a signal storage medium for storing said signal applied thereto, said signal being recorded thereon in the form of substantially parallel tracks having their ends at said boundaries, the length of each of said tracks corresponding to at least one of said periods, each of said tracks comprising a plurality of discrete segments each of which corresponds to one of said sub-periods of said signal, said segments of any given track being positioned directly alongside the segments of adjacent tracks so as to form rows of segments which are perpendicular to the direction of said tracks, the segments in any given row further being in juxtaposed relationship with the segments in said row adjacent thereto, and said tracks being so positioned on said medium that the segments of the different tracks which represent corresponding sub-periods of the different periods of said signal occupy corresponding positions with respect to said boundaries of said medium.

*13. The system of claim 1 in which said storage medium comprises tape, said tracks being oblique across said tape, and in which said reproducing means comprises at least one reproducing head having a rather broad width compared with the distance between said closely adjacent oblique tracks.*

*14. The system of claim 8 in which said reproducing means comprises at least one reproducing head having a rather broad width compared with the distance between said adjacent tracks.*

*15. The system of claim 8, in which the recording means for providing said oblique tracks comprises two separated coaxial cylinders for recording said oblique tracks, said tape being transported around said two coaxial cylinders to provide said oblique track, and at least one rotating head scanning the inside of said tape.*

*16. The recording system of claim 11, further comprising means for reproducing said periodic signal having at least one reproducing head having a rather broad width compared with the distance between said tracks.*

*17. A signal recording system for recording on a tape storage medium having parallel boundaries, a periodic signal having a plurality of sub-periods, comprising recording transducer means and means for moving said transducer means relative to and in close proximity to said storage medium to record said signal on said storage*

*medium in the form of substantially oblique parallel tracks having their ends at said boundaries, the relative speed between said transducer means and said storage medium being selected so that the length of each of said recorded tracks corresponds to at least one of said periods, each of said tracks comprising a plurality of discrete segments each of which corresponds to one of said sub-periods of said signal, said segments of any given track being positioned directly alongside the segments of adjacent tracks so as to form rows of segments which are perpendicular to the direction of said tracks, the segments in any given track further being in juxtaposed relationship with the segments in said track adjacent thereto, and said tracks being so positioned on said medium that the segments of the different tracks which represent corresponding sub-periods of the different periods of said signal occupy corresponding positions with respect to said boundaries of said medium.*

References Cited

The following references, cited by the Examiner, are of record in the patented file of this patent or the original patent.

UNITED STATES PATENTS

| | | | |
|---|---|---|---|
| 3,215,772 | 11/1965 | Kihara | 178—6.6 A |

FOREIGN PATENTS

| | | | |
|---|---|---|---|
| 812,468 | 4/1959 | Great Britain | 178—6.6 A |
| 1,086,739 | 8/1960 | Germany | 178—6.6 A |
| 797,620 | 7/1958 | Great Britain | 178—6.6 A |
| 1,055,700 | 4/1959 | Germany | 178—6.6 A |

OTHER REFERENCES

Journal of the Institute of Television Engineers of Japan, vol. 14, No. 9, September 1960, pp. 390–396.

Okamura, Shiro: "A New Video Tape Recording System," Reports of the University of Electro Communications (Japan), March 1959, pp. 206–213.

HOWARD W. BRITTON, Primary Examiner

U.S. Cl. X.R.

178—6.6 FS, 6.6 SF; 179—100.2 T